United States Patent Office 3,647,711
Patented Mar. 7, 1972

3,647,711
USE OF CYCLIC AMIDINE POLYMERS AS
OIL-IN-WATER DEMULSIFIERS
Robert R. Annand, St. Louis, and Derek Redmore, Ballwin, Mo., and Brian M. Rushton, Williamsville, N.Y., assignors to Petrolite Corporation, Wilmington, Del.
No Drawing. Original application Oct. 22, 1965, Ser. No. 502,636, now Patent No. 3,531,496, dated Sept. 29, 1970. Divided and this application May 18, 1970, Ser. No. 38,509
Int. Cl. B01d 17/04
U.S. Cl. 252—344
10 Claims

ABSTRACT OF THE DISCLOSURE

The use of cyclic amidine polymers as oil-in-water demulsifiers. These polymers are formed (1) by reacting cyanohydrins with (2) cyclic amidine-forming polyamines to form polyaminonitriles; and by further reacting these polyaminonitriles intermolecularly or with a polyamine under cyclic amidine-forming conditions to form the polymers.

This application is a division of application S.N. 502,636 filed Oct. 22, 1965, now U.S. Pat. No. 3,531,496, granted on Sept. 29, 1970.

This invention relates to cyanoamino compounds, to cyclicamidine polymers, to processes by which they are made, and to uses therefore. More particular, this invention relates to cyanoamino compounds, to cyclic amidine polymers derived from reacting cyanohydrins, or their equivalents, with cyclic amidine-forming amines, to processes by which they are made, and to uses therefore.

It is well known that a carbonyl group reacts with HCN to form a cyano hydrin group

These are illustrated by the following reactions which are usually carried out in the presence of a cyanide ion.

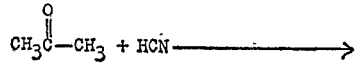

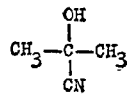

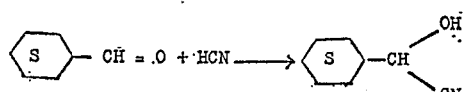

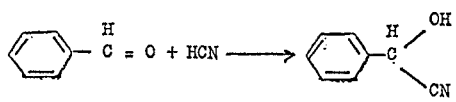

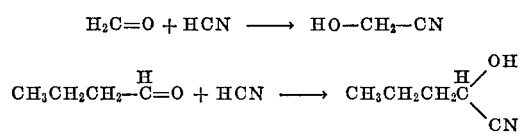

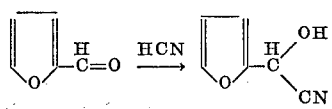

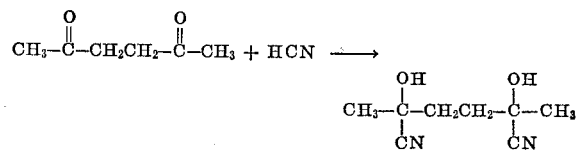

The reaction of a carbonyl group with HCN to form cyanohydrins is a general reaction for aliphatic ketones having at least one methyl group attached to the carbonyl group. It is particularly applicable to aldehydes, cyclic-ketones, etc. Thus, the carbonyl compounds may be aliphatic, aromatic, heterocyclic, cycloaliphatic, combinations thereof such as alkaryl, alkylheterocyclic, etc.; may be derived from mono- or poly-carbonyls; may be aldehydes, ketones, and the like.

We have now found that cyanohydrins react with cyclic amidine-forming polyamines, which are capable of forming polymers, to form a cyclic amidine polymer. These are illustrated by the following reactions:

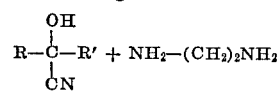

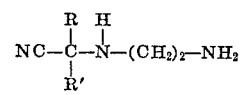

which further reacts to yield a polymer having the following unit:

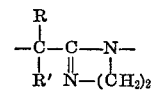

Analogous polymers having a tetrahydropyrimidine group are formed from polyamines having three carbons between the amino groups, for example, of the formula

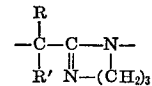

It is noted that the above reaction is an intermolecular reaction of one molecular species. In addition two moles of the cyanohydrin can also react with one mole of polyamine in the following manner:

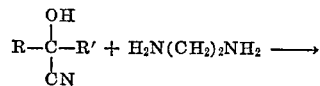

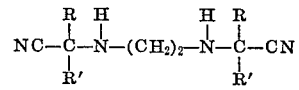

This dinitrile is capable of further reaction with a cyclic amidine forming amine capable of forming a polymer to form the cyclic amidine polymers of this invention as illustrated by the following reactions:

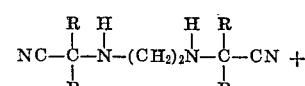

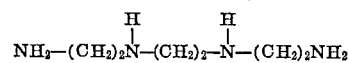

to yield a polymer having the following polymeric unit:

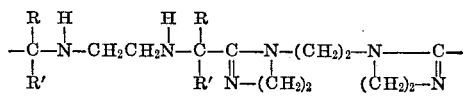

Analogous polymers are formed from polyamines having three carbons between the amino groups to yield a tetrahydropyrimidine group, for example, of the formula

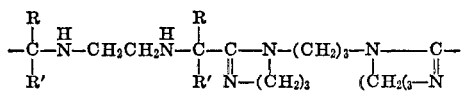

In addition to employing the cyanohydrin, a derivative thereof may be employed. For example, a volatile amine, such as a dialkylamine, may be reacted with the cyanohydrin to form an amine derivative and this more volatile amine component may be replaced by the higher boiling polyamines employed in this invention. This may be illustrated by the following reactions:

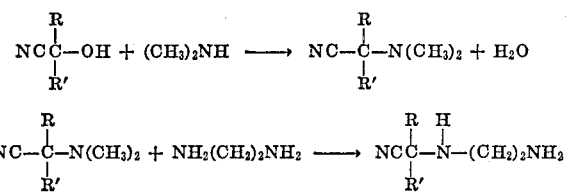

or

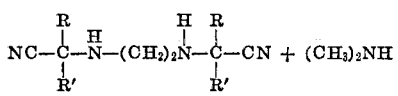

which can be polymerized with a cyclic amidine forming polyamine to yield the polymer of this invention.

The polymers of this invention may be illustrated, for example, by the following general formulae:

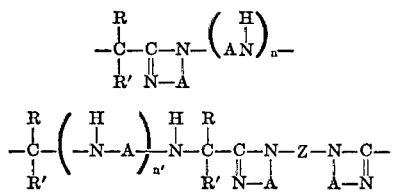

where R and R' (which may be the same or different) are hydrogens or a substituted group, for example, alkyl, aryl, cycloalkyl, heterocyclic, etc. or joined in a cyclic structure such as in a cycloalkyl ring, etc.; preferably in the instance where both R and R' are substituted in a noncyclic configuration that one of the R's is preferably methyl; A is for example an alkylene group having 2–3 carbons in the main chain (but may also be branched); Z is the moiety of the cyclic amidine forming amine, for example

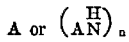

where $n'=1$ or greater, for example 1–5 or more; $n=0-5$ or more. The number of carbons in the R or R' groups can range, for example, from 1–18 or more carbons.

These polymers have a cyclic amidine group in the main chain of the polymer as contrasted to a cyclic amidine pendant group. They are formed, for example, by reacting (1) a cyanohydrin with one mole of a cyclic amidine-forming polyamine so that the resulting compound has both a nitrile and a cyclic amidine-forming moiety; (2) O dinitrile derived from a cyanohydrin and a cyclic amidine-forming polyamine which is di-functional in relation to its cyclic amidine-forming function, i.e. having two pairs of cyclic amidine-forming groups, i.e.

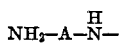

groups.

Any cyanohydrin capable of reacting with a cyclic amidine-forming polyamine to form a cyclic amidine polymer can be employed.

The amines employed herein are polyalkylene polyamines, for example, of the formula

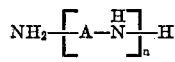

where $n$ is an integer 1, 2, 3, 4, 5, 6, 7, 8, 9, 10, etc., and A is an alkylene group, provided that the polyamine contains an alkylene moiety of a cyclic-amidine forming group, i.e., a group having a $$NH_2(CH_2)_{2-3}N\overset{H}{-}$$

group.

One or more of the hydrogens on the CH$_2$ groups may be substituted for example, by such groups as alkyl groups, for example, methyl, ethyl, etc. Examples of A include

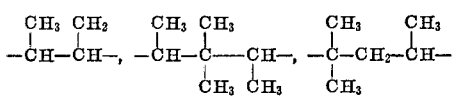

Examples of polyamines include the following: ethylene diamine, propylene diamine, diethylene triamine, dipropylene triamine, triethylene tetramine, tripropylene tetramine, tetraethylene pentamine, tetrapropylene pentamine, polyalkyleneimines, i.e. the higher molecular weight amines derived from alkyleneimine such as polyethyleneimines, polypropyleneimines, etc. Mixtures of the above polyamine amines and those polyamines containing both ethylene and propylene groups, for example

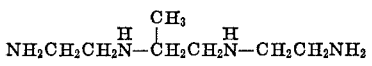

$$NH_2CH_2CH_2N\overset{H}{-}(CH_2)_4-\overset{H}{N}-CH_2CH_2CH_2NH_2$$

etc., can be employed.

Some of the N-groups may be substituted (provided the polyamine is cyclic-amidine forming), for example, with hydrocarbon groups such as alkyl groups, etc.

The reaction of the polyamine with the cyanohydrin takes place quite readily at ambient temperatures, for example, at about 20–80° C. or higher, but preferably at about 30–50° C. After the addition of one reactant to the other, the reaction mixture is heated at a temperature sufficiently high to remove the water formed during the reaction. Reduced pressure may be employed, if desired, to remove water and unreacted components. An azeotrope agent may be employed. Optimum temperature and conditions will of course depend upon the particular amine employed and the particular product desired.

The polyamine is reacted so that a residual cyclic amidine-forming group remains or until a dinitrile is formed. Stoichiometric amounts of reactants can be employed. However, in preparing the monocyano product it is preferred to employ an excess of polyamine. In the case of the dicyano product the reaction proceeds so readily that no excess of either reactant is generally employed.

The mono-cyano cyclic amidine-forming polyamine or the dicyano polyamine is then intermolecularly reacted with itself, or with a polyamine, under cyclic amidine-forming conditions to form the polymer of this invention. It is preferable that a catalyst be employed to speed up the reaction. Among such catalysts are organic and inorganic salts such as sulfonic acids, etc. However, it is preferred to use sulfur compounds such as H$_2$S, thioacids, thioamides, thioketones, thiourea, dithiobiurette, etc., as catalysts.

In general the temperature of polymerization will vary with the particular reactants, catalysts, etc. In general, the reaction is carried out from about 75° to 200° C., such as from about 100° to 175° C., but preferably from about 150° to 170° C. Optimum temperatures will vary with the particular system.

The molecular weight of the polymer can vary widely depending on various factors such as reactants, conditions, ultimate uses, etc. In general, the polymer may contain about 2 to 100 or more units, such as 5–50, for example, 8–40, but polymers having 4–15 are advantageously employed for the uses disclosed herein.

In addition, to the basic form of these polymers, one can, in certain instances, prepare salts or quaternaries, either with organic or inorganic acids or quaternizing agents such as benzyl halides, alkyl halides, etc., dihalides such as alkylene dihalides, xylylene dihalides, alkylene ether dihalides such as $(XCH_2CH_2)_2O$, etc. Being basic the cyclic amidine unit readily forms salts, including di- and polysalts.

Examples of acids which can be employed to form salts include HCl, $H_2SO_4$, $H_3PO_4$, hydrocarbon sulfonic acids, acetic acid, oxalic acid, maleic acid, oleic acid, abietic acid, naphthenic acid, rosin, benzoic acid, phthalic acid, diglycollic acid, etc.

The following examples are presented for purposes of illustration and not of limitation.

EXAMPLE 1

To a stirred solution of ethylene diamine (120 g.; 2 moles) in benzene (200 ml.) was added acetone cyanohydrin (42.5 g.; 0.5 moles) dropwise during 30 minutes. An exothermic reaction took place. The apparatus was fitted with a Dean and Stark trap and the mixture heated under reflux for 2 hours during which time 9 mls. (0.5 mole) of water was collected. Benzene and excess ethylene diamine were removed in vacuo to yield 54.2 g. (86%) of N-(β-aminoethyl) α-amino isobutyronitrile as a pale yellow oil.

Analysis as follows was obtained: $C_6H_{13}N_3$ requires total N, 33%; found: 31.0%; basic N, 22.0%; found: 20.0%; molecular wt. 127; found: (osmometry) 124. To the aminonitrile (54 g.) was added thiourea (750 mg.) and the mixture heated at 140–160° for 5 hours. After the addition of 250 mg. more thiourea heating was continued for 3 hours at which time ammonia evolution had ceased. The product, a dark viscous oil, was very soluble in water, methanol and acetone and virtually insoluble in ether and benzene. The molecular weight of the crude product was 350 by osmometry. The infrared spectrum of the product had peaks at 2.9μ (N—H) and 6.2μ (C=N) indicating a cyclic amidine structure. The polymer has the following unit formula

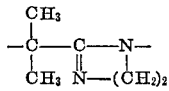

EXAMPLE 2

Acetone cyanohydrin (425 g.; 5 moles) was added dropwise with stirring to ethylene diamine (300 g.; 5 moles) during one hour. The reaction was cooled in an ice bath to maintain a temperature of 30–35°. The mixture was heated and water (100 ml.) was removed by distillation. Thiourea (5 g.) was added and the mixture was heated to 180°. Ammonia evolution was copious. After 5 hours more thiourea (2 g.) was added and heating continued for 3 more hours when no more ammonia was evolved. The product showed an identical infrared spectrum with that from Example 1.

EXAMPLE 3

Acetone cyanohydrin (85 g.; 1 mole) was reacted with 25% aqueous dimethylamine (180 g.; 1 mole) to produce N,N-dimethyl 2-aminoisobutyronitrile 81 g.; 72%, B.P. 72–3°/48 mm., (Jacobson, J. Amer. Chem. Soc. 67, 1996 (1945)). To the nitrile (81 g.; 0.72 mole) was added ethylene diamine (43 g.; 0.72 mole). On heating to 90–95° dimethylamine was rapidly evolved to produce N-(β-aminoethyl) α-amino isobutyronitrile. This was heated at 160° for 10 hours with thioacetamide to produce the polymer described in Example 1.

EXAMPLE 4

To a stirred solution of ethylene diamine (48 g.; 0.8 mole) in benzene (150 ml.) was added cyclohexanone cyanohydrin (100 g.; 0.8 mole) during 40 minutes. Heat was evolved. The mixture was heated under reflux using a Dean and Stark trap to collect water. After 15 ml. of water had been collected the solvent was removed in vacuo to yield a semi-solid material. 130 g. (98%). This nitrile (40 g.; 24 mole) was heated at 150° for 3 hours with thiourea (400 mg.) while ammonia was evolved. After the addition of 200 mg. thiourea the mixture was heated for a further 10 hours. The product was a dark resinous material which was insoluble in water but readily soluble in isopropanol.

The polymer had the following unit formula

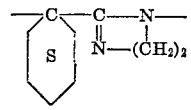

EXAMPLE 5

Benzaldehyde cyanohydrin (mandelo nitrile) (134 g.; 1 mole) was reacted with ethylene diamine (60 g. 1 mole) in the manner of the preceding examples. The product was heated in presence of thiourea in the manner described above to produce a polymer with the elimination of ammonia. The polymer was insoluble in water but readily soluble in ethanol, isopropanol and acetone.

The polymer has the following unit formula

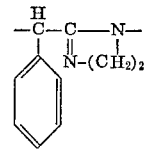

EXAMPLE 6

Hexylmethyl ketone cyanohydrin was prepared by reaction of the bisulphite complex with cyanide ion. The cyanohydrin (26 g.; 0.19 mole) was reacted with ethylene diamine (11.4 g.; 0.19 mole) and the water produced removed by azeotropic distillation. Heating this adduct with thioacetamide (300 mg.) for 24 hours at 170–180° brought about complete reaction. The infrared spectrum showed absorption at 6.2μ (—C=N—) and absence of cyano group. The product was soluble in butanol but insoluble in water.

The polymer has the following unit formula:

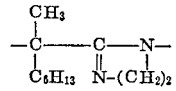

EXAMPLE 7

Reaction of 1 mole of ethylene diamine with 2 moles of acetone cyanohydrin produced, after chromatography on alumina from benzene N,N' (bis-isobutyronitrilo) ethylene diamine as colorless rosettes, M.P. 56°. Heating of this dinitrile (15.7 g.; 081 moles) with ethylene diamine (5 g.; .081 mole) and thioacetamide (100 mg.) at 160–170° for 10 hours was accompanied by a rapid evolution of ammonia. The product was a dark viscous gum which proved to be identical by infrared comparison with the material prepared in Example 1. Behavior in tests for corrosion was also identical.

The polymer has the following unit formula:

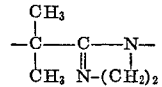

EXAMPLE 8

The dinitrile (19.4 g.; 0.1 mole) described in Example 7 was heated with triethylene tetramine (14.6 g.; 0.1 mole) and thiourea (400 mg.) for 8 hours at 170–190°. The resultant product was a dark oil whose infrared spectrum showed the presence of imidazoline rings and a small amount of unchanged nitrile. A quantitative measure of the ammonia evolved indicated that the reaction was approximately 60% complete.

The polymer has the following unit formula

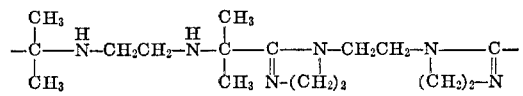

EXAMPLE 9

To cyclohexanone cyanohydrin (50 g.; 0.4 mole) in benzene (100 ml.) was added ethylene diamine (12 g.; 0.2 mole) during 30 minutes. Water (8 ml.) was removed by azeotropic distillation using a Dean and Stark trap for collection. Removal of the solvent in vacuo produced an oily solid (50 g.). Recrystallization from ethanol produced colorless needles, M.P. 123–5° of N,N'-bis-(1-cyanocyclohexyl)ethylene diamine. Analysis as follows: $C_{16}H_{26}N_4$ requires N 20.4%, found N 20.3%. Reaction of this dinitrile with triethylene tetramine in the presence of thiourea in the manner of Example 8, produced the expected polymer by evolution of ammonia.

The polymer has the following unit formula

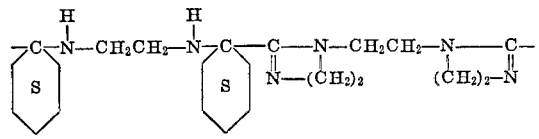

To avoid unnecessary repetition, further non-limiting examples listed in the following table are polymerized by the general procedures outlined above.

The abbreviations in this table have the following meanings:

E.D.—Ethylene diamine
A.C.—Acetone cyanohydrin
H.M.C.—hexylmethyl ketone cyanohydrin
P.D.—Propylene diamine
C.H.C.—Cyclohexanone cyanohydrin
T.E.T.—Triethylene tetramine
D.E.T.—Diethylene triamine
T.E.P.—Tetraethylene pentamine
Amine #1—A mixture of T.E.T., D.E.T., and T.E.P.

The moles specified in Table I are actual stoichiometric amounts reacted to form the mono- or the di-cyano polyamines and polymers. Thus, in Example 10 the monocyano amine is formed by reacting one mole of the first amine with one mole of the cyanohydrin which is then polymerized. In Example 12, the dicyano amine is formed by reacting one mole of the first amine with 2 moles of the nitrile and then further polymerized by reaction with the second amine.

BREAKING OIL-IN-WATER EMULSIONS

The polymers of this invention can also be used in a process for resolving or separating emulsions of the oil-in-water class, by subjecting the emulsion to these polymers.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps, wax-hexane-water emulsions, encountered in de-waxing operations in oil refining; butadiene tar-in-water emulsions, in the manufacture of butadiene from heavy naphtha by cracking in gas generators, and occurring particularly in the wash box waters of such systems; emulsions of "flux oil" in steam condensate produced in the catalytic dehydrogenation of butylene to produce butadiene; styrene-in-water emulsions, in synthetic rubber plants, synthetic latex-in-water emulsions, in plants producing copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsions paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficult to recover.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

TABLE I

| Example | 1st amine | Nitrile | 2d amine | Catalyst | Polymerization time, hours |
|---|---|---|---|---|---|
| 10 | 1 mole P.D | 1 mole A.C | | Thiourea | 10 |
| 11 | do | 1 mole H.M.C | | Thioacetamide | 20 |
| 12 | do | 2 mole C.H.C | 1 mole T.E.T | Thiourea | 20 |
| 13 | do | do | 1 mole T.E.P | Thioacetamide | 18 |
| 14 | do | do | 1 mole T.E.T | Thiourea | 20 |
| 15 | do | 2 mole A.C | 1 mole T.E.P | do | 12 |
| 16 | 1 mole E.D | do | do | do | 14 |
| 17 | 1 mole D.E.T | do | 1 mole T.E.T | do | 20 |
| 18 | do | do | 1 mole T.E.P | do | 20 |
| 19 | 1 mole T.E.P | do | 1 mole T.E.T | do | 20 |
| 20 | do | do | 1 mole T.E.P | do | 20 |
| 21 | do | 2 mole C.H.C | 1 mole T.E.T | do | 15 |
| 22 | do | 2 mole A.C | 1 mole T.E.P | do | 15 |
| 23 | 1 mole D.E.T | 2 mole C.H.C | do | do | 15 |
| 24 | 1 mole amine #1 | 2 mole A.C | 1 mole amine #1 | do | 20 |
| 25 | do | 2 mole H.M.C | do | do | 20 |
| 26 | 1 mole D.E.T | 1 mole A.C | | Thioacetamide | 15 |
| 27 | 1 mole T.E.T | do | | do | 16 |

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsions paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of dispersed phase are commonly of such stability as to be less responsive to the present polymers, possibly because of the appreciable content of emulsifying agent present in such systems, whether intentionally incorporated for the purpose of stabilizing them, or not.

Although the present invention relates to emulsions containing as much as 20% dispersed oily material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amount of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion; yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown and as a matter of fact an emulsifying agent, in the conventional sense, may be felt to be absent. It is obviously very difficult or even impossible to recommend a resolution procedure for the treatment of such latter emulsions on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of the polymer of the kind described, thereby causing the oil particles in the emulsion to coalesce sufficiently to rise to the surface of the non-oily layer (or settle to the bottom, if the oil density is greater), when the mixture is allowed to stand in the quiescent state after treatment with the polymer reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The present reagents are useful because they are able to recover the oil from oil-in-water class emulsions advantageously and at low cost. In some instances, they have been found to resolve emulsions which are not economically or effectively resolvable by any other known means.

These polymeric reagents are useful in undiluted form or diluted with any suitable solvent. Water is commonly found to be a highly satisfactory solvent, because of its ready availability and negligible cost; but in some cases, non-aqueous solvents such as aromatic petroleum solvent may be found preferable. The products themselves may exhibit solubilities ranging from rather modest water-dispersibility to full and complete dispersibility in that solvent. Because of the small proportions in which our reagents are customarily employed in practicing our process, apparent solubility in bulk has little significance. In the extremely low concentrations of use they undoubtedly exhibit apprecaible water-solubility of water-dispersibility as well as oil-solubility or oil-dispersibility.

These polymeric reagents may be employed alone, or they may in some instances be employed to advantage admixed with other and compatible oil-in-water demulsifiers.

This process is commonly practiced simply by introducing sufficient but minor proportions of the polymer into an oil-in-water class emulsions, agitating to secure distribution of the reagent and incipient coalescence, and letting stand until the oil phase separates. The proportion of polymer required will vary with the character of the emulsion to be resolved. Ordinarily, proportions of reagent required are from about .005 p.p.m.–10,000 p.p.m. such as 1–1000 p.p.m., for example about 3–300 p.p.m., but preferably 5–50 p.p.m., based on the volume of emulsions treated, but more is sometimes required. Since the economics of the process are important, no more is employed than is required for effective separation. It has been found that such factors as the nature of the particular polymer, feed rate, agitation and settling time are somewhat interrelated. For example, if sufficient agitation of proper character is employed, the settling time is shortened materially. On the other hand, if satisfactory agitation is not available, but extended settling time is, the process is equally productive of satisfactory results.

Agitation may be achieved by any avilable means. In many cases, it is suffiicent to introduce the polymeric reagent into the emulsion and use the agitation produced as the latter flows through a conduit or pipe. In some cases, agitation and mixing are achieved by stirring together or shaking together the emulsion and polymer. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved, until it constitutes a difference in kind rather than degree. A sub-aeration type flotation cell, of the kind commonly employed in ore beneficiation operations, is an extremely useful adjunct in the application of these polymer reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with our reagents. Still there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optmum value.

The polymeric reagent feed rate also has an optimum range, which is sufficiently wide, however, to meet the tolerances required for the variances encountered daily in commercial operations. A large excess of reagent can produce distinctly unfavorable results.

The manner of practicing the present invention is clear from the foregoing description. However, for completeness the following non-limiting specific examples are included for purposes of illustration.

An oil-in-water petroleum emulsion was treated as follows:

A series of four bottles of the emulsion were treated with the polymeric reagents in the following concentrations 30, 15, 7.5 and 3.75 p.p.m., based on the emulsion. A commercial oil-in-water demulsifier was run as a control and at the same concentrations as the polymeric reagent after sufficient agitation, in the form of 130 shakes per minute for 5 minutes. The bottles were observed and comparisons drawn between the effect of the polymeric reagent and the commercial demulsifier as to which gave the clear water layer.

In all cases employing the polymeric reagents of Examples 1–27, inclusive, including those set forth in Table I, it was found that the polymeric reagents of this invention were superior to the commercial demulsifier. After selecting the demulsifier by the above procedure, the demulsifier is employed in a commercial application. The following illustrates commercial applications of this invention, employing the compounds of Examples 1–27, inclusive, including those set forth in Table I.

Commercial Example A

This process is practiced on location by flowing the well fluids, consisting of free crude oil, oil-in-water emulsion, and natural gas, through a gas separator, then to a steel tank of 5,000-barrel capacity. In this tank, the oil-in-water emulsion falls to the bottom and is so separated from the free oil. The oil-in-water emulsion is withdrawn from the bottom of this tank, and the demulsifier selected is introduced into the stream at this point. Depending on the emulsion, the proper proportion of demulsifier is employed.

The chemicalized emulsion flows to a second tank, mixing being achieved in the pipe. In the second tank it is allowed to stand quiescent. Clear water is withdrawn from the bottom of this tank, separated oil from the top.

Commercial Example B

This is an example of the application of the aeration step in our process. The emulsion is a naturally-occurring petroleum oil-in-water emulsion. It is placed in a sub-aeration flotation cell of the type commonly employed in the ore beneficiation industry. The stirring mechanism is started to begin introduction of the air, and at the same time the mixture of the selected demulsifier is added in the proper proportions of demulsifier to emulsion. Clear examples are taken from the bottom of the machine.

This example illustrates the beneficial influence of the aeration technique. In most cases, it accelerates separation. In some, it permits use of smaller proportions of reagent; but in some cases, it achieves resolution, whereas, in absence of its use, satisfactory separation may not be achieved in reasonable time with reasonable reagent consumption.

These reagents have likewise been successfully applied to other oil-in-water class emulsions, of which representative examples have been referred to above. Their use is, therefore, not limited to crude petroleum-in-water emulsions.

OTHER DERIVATIVES

These products may be further reacted to form derivatives thereof, for example, they may be oxyalkylated with alkylene oxides such as ethylene oxide, propylene oxide, butylene oxide, octylene oxide, alone or in combination; with styrene oxide, glycide, methyl glycide, allyl glycidyl ether, glycidyl isopropyl ether, glycidyl phenylether, diepoxides, polyepoxides, etc.

They may be reacted with alkylene imines such as ethyleneimine, propylene imine, etc., dialkylaminoepoxypropane of the structure

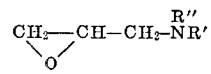

where the R's are alkyl, etc.

They may be acylated with monocarboxylic acids, such as aromatic acids, fatty acids, aliphatic acids, etc. and polycarboxylic acids, aliphatic dicarboxylic acids, aromatic dicarboxylic acids for example diglycollic, phthalic, succinic, etc., acids.

These compounds may also be treated with more than one agent, for example, they may be partially acylated, then oxyalkylated, partially oxyalkylated then acylated, etc.

Salts may be formed of these polymers as derivatives for example salts of either organic or inorganic acids such as acetic acid, glycollic acid, fatty acids, benzoic acid, etc. HCl, sulfuric acids, etc.

OTHER USES

In addition to the uses described above, these compositions and/or derivatives thereof, can be used as follows:

(1) as demulsifiers for oil-in-water emulsions
(2) as biocides i.e. bacteriocides, algicides, etc.
(3) as additives to various petroleum fuels including gasoline, diesel fuel, jet fuels, etc.
(4) as gasoline anti-icers and anti-stallers
(5) as flotation agents, such as flotation collection agents
(6) as asphalt emulsifiers and anti-stripping agents for asphalt-mineral aggregate compositions
(7) as emulsifiers, for example, in metal cleaners, auto polishes, wax emulsions, etc.
(8) as additives for sludging oil and cutting oils (9) as fuel "dehazing" agents
(10) as agents for preparing emulsions for the "hydrofrac" process of enhancing oil recovery
(11) as agents to prepare polymer emulsions
(12) as agents of solvents to inhibit paraffin deposition
(13) as agents for the textile industry such as mercerizing assistants, wetting agents, rewetting agents, penetrating agents, dispersing agents, softening agents, dyeing assistants, etc.
(14) as anti-static agents for textile, plastics, etc.
(15) as agents in leather processing
(16) as lube oil additives
(17) as emulsifiers for insecticidal and agricultural compositions
(18) as additives for rubber latices, for example, to prevent acid coagulation
(19) as additives in the production of latex foam rubber, for example, as gel sensitizers and processing aids in the manufacture of foam rubber
(20) as additives for pigment dispersion in various applications such as paints, plastic, rubber, etc.
(21) as additives for primer paints to help insure adhesion to metallic surfaces
(22) as additives useful as a freeze-thaw stabilizer for latex-base paints
(23) as agents for the pulp and paper industry, such as sizing aids, etc.
(24) general metal deactivators

Having thus described our invention what we claim as new and desire to obtain by Letters Patent is:

1. A process of demulsifying an oil-in-water emulsion comprising adding to said emulsion an effective demulsifying amount of a polymer consisting of 2–100 recurring units, the recurring structural unit being selected from the group consisting of (I) 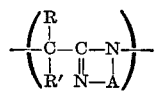

(II) 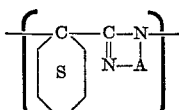

(III) 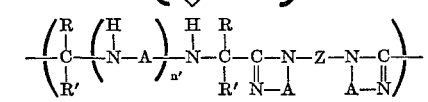

and (IV) 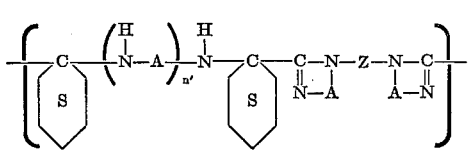

wherein each of R and R' is selected from the group consisting of hydrogen, alkyl of 1 to 18 carbon atoms, and phenyl, with the proviso that only one of each R and R' is hydrogen, A is an alkylene group selected from the group consisting of —CH$_2$—CH$_2$—,

—CH$_2$—CH$_2$—CH$_2$—

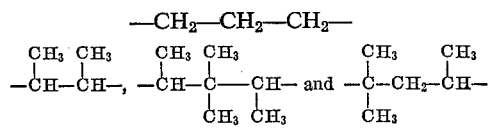

Z is selected from the group consisting of A and

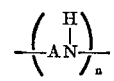

n is from 0 to 9 and
n' is from 1 to 9.

2. The process of claim 1 wherein the recurring structural unit is

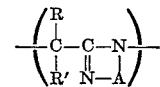

3. The process of claim 2 wherein
R is CH$_3$ and
R' is an alkyl group of 1 to 18 carbon atoms.
4. The process of claim 3 wherein R' is CH$_3$.
5. The process of claim 4 wherein A is —CH$_2$—CH$_2$—.
6. The process of claim 3 wherein R' is C$_6$H$_{13}$ and A is —CH$_2$—CH$_2$—.
7. The process of claim 1 wherein the recurring structural unit is

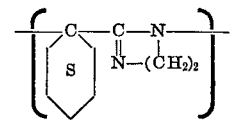

8. The process of claim 1 wherein the recurring structural unit is

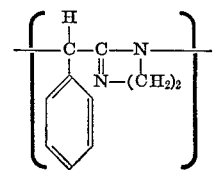

9. The process of claim 1 wherein the recurring structural unit is

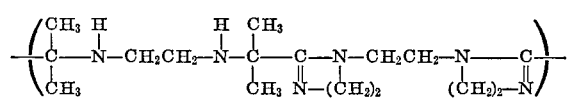

10. The process of claim 1 wherein the recurring structural unit is

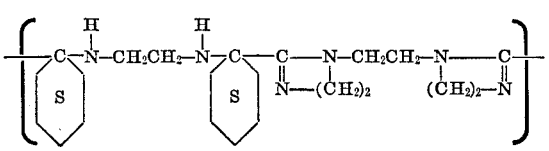

References Cited
UNITED STATES PATENTS 3,531,496   9/1970   Annand et al. _____ 260—309.6

JOHN D. WELSH, Primary Examiner